(12) United States Patent
Ziegler

(10) Patent No.: US 10,244,189 B2
(45) Date of Patent: Mar. 26, 2019

(54) COUPLINGS FOR ROTARY INTERFACES

(71) Applicant: Cloud Cap Technology, Inc., Hood River, OR (US)

(72) Inventor: Jeremy Ziegler, Hood River, OR (US)

(73) Assignee: Cloud Cap Technology, Inc., Hood River, OR (US)

( * ) Notice: Subject to any disclaimer, the term of this patent is extended or adjusted under 35 U.S.C. 154(b) by 254 days.

(21) Appl. No.: 15/063,059

(22) Filed: Mar. 7, 2016

(65) Prior Publication Data

US 2017/0256838 A1  Sep. 7, 2017

(51) Int. Cl.
*H04N 5/33* (2006.01)
*H01P 1/06* (2006.01)

(52) U.S. Cl.
CPC ............... *H04N 5/33* (2013.01); *H01P 1/067* (2013.01)

(58) Field of Classification Search
CPC .................................. H04N 5/33; H01P 1/067
USPC ....................................................... 250/338.1
See application file for complete search history.

(56) References Cited

U.S. PATENT DOCUMENTS

| 3,715,688 | A | | 2/1973 | Woodward | |
|---|---|---|---|---|---|
| 4,879,534 | A | * | 11/1989 | Spinner | H01P 1/06 333/257 |
| 5,208,569 | A | * | 5/1993 | Michelangelo | H01P 1/065 285/321 |
| 7,446,623 | B2 | | 11/2008 | Tavassoli Hozouri | |
| 2007/0297727 | A1 | * | 12/2007 | Ueno | G02B 6/3604 385/93 |
| 2016/0020499 | A1 | * | 1/2016 | Kawamura | H01P 1/042 333/208 |

FOREIGN PATENT DOCUMENTS

| CN | 202797192 U | 3/2013 |
|---|---|---|
| EP | 2360491 A1 | 8/2011 |
| GB | 595352 A | 12/1947 |

* cited by examiner

*Primary Examiner* — David P Porta
*Assistant Examiner* — Gisselle M Gutierrez
(74) *Attorney, Agent, or Firm* — Locke Lord LLP; Scott D. Wofsy; Joshua L. Jones

(57) ABSTRACT

A rotary coupling includes a first waveguide, a second waveguide that is coaxial with the first waveguide and supported for rotation relative to the first waveguide, and a collar. The collar is connected to one of the first and second waveguides and extends circumferentially about an end of the other of the first and second waveguides to reduce attenuation of electromagnetic radiation conveyed between the first waveguide and the second waveguide.

18 Claims, 5 Drawing Sheets

COUPLINGS FOR ROTARY INTERFACES

BACKGROUND OF THE INVENTION

1. Field of the Invention

The present disclosure relates to rotary interfaces, and more particular to couplings for communicating data across rotary interfaces.

2. Description of Related Art

Mechanical devices commonly include rotary interfaces between rotary and stationary elements of the device. Some mechanical devices of data sources and data destinations disposed on opposite sides the rotary interface defined the rotary and stationary elements. In such devices it can be necessary to communicate data across the rotary interface without the use of a data conduit fixed to both the rotary and stationary element. For example, video cameras mounted on rotary platforms commonly employ a slip ring assembly to move data between the camera and a data destination fixed relative to the camera using slip ring assemblies. Slip ring assemblies commonly use fixed conductor that slides across a metallic annulus, electrical current conveyed across the moving interface relaying data between the camera and the data destination. Other video camera arrangements use fiber optic bundle optically coupled to one another, one bundle being fixed relative to the camera and the other bundle being fixed relative to the data destination. The frequency, bandwidth, and/or data rate across rotary interfaces can be influenced by the properties of the electrical connection or rotary coupling across the rotary interface.

Such conventional methods and systems of communicating data across rotary interfaces have generally been considered satisfactory for their intended purpose. However, there is still a need in the art for improved data links for rotary joints. The present disclosure provides a solution for this need.

SUMMARY OF THE INVENTION

A rotary coupling includes a first waveguide, a second waveguide that is coaxial with the first waveguide and supported for rotation relative to the first waveguide, and a collar. The collar is connected to one of the first and second waveguides and extends circumferentially about an end of the other of the first and second waveguides to reduce attenuation of electromagnetic radiation conveyed between the first waveguide and the second waveguide.

In certain embodiments, an axial gap can be defined between abutting ends of the first and second waveguides. The axial gap can have a width that is less than one-quarter the wavelength of the electromagnetic radiation conveyed between the first waveguide and the second waveguide. The collar can be connected to the first waveguide. The collar can span the axial gap of about one-quarter wavelength to provide an impedance transformation. A radial gap can be defined between an interior of the collar and an end of the second waveguide abutting the first waveguide. The radial gap can have a width that is less than one-quarter the wavelength of the electromagnetic radiation conveyed between the first waveguide and the second waveguide.

In accordance with certain embodiments, either or both of first and second waveguides can define a hollow interior with a circular cross-sectional area. Either or both of the first and second waveguides can include a hollow tube. Either or both the first and second waveguides can have an external diameter that is less than about 2 inches (about 50 millimeters). Either or both the first and second waveguides can have an internal width that is less than about 0.2 inches (about 4.5 millimeters). The first and second waveguides can be non-optical waveguides, conveying radio-frequency energy therethrough by way of example. It is contemplated that first and second waveguides can be dimensioned to convey radio-frequency energy in a frequency band between about 57 gigahertz and about 64 gigahertz.

It also is contemplated that, in accordance with certain embodiments, the rotary coupling can include a slip ring. The slip ring can have a through bore extending longitudinally through an interior of the slip ring. The through bore can extend between opposed first and second ends of the slip ring. The collar can be disposed within the through bore and circumferentially surrounded by the slip ring. The first waveguide can extend from the collar, along the through bore, and through the first end of the slip ring. The second waveguide can extend from the collar, along the through bore, and through the second end of the slip ring.

A sensor assembly includes a mount defining a mount axis, a gimbal supported for rotation about the mount axis, a sensor coupled to the gimbal, and a rotary coupling as described above interposed between the mount and gimbal along the mount axis. The first waveguide is fixed relative to the mount. The second waveguide is fixed to relative to the gimbal, and the sensor is communicative with a transceiver fixed relative to the mount through the first and second waveguides to rotate relative to the transceiver.

In certain embodiments, the rotary coupling can include a slip ring interposed between the mount and the gimbal. The slip ring can define a through extending along the mount axis, and the collar of the waveguide can be disposed within the through bore. The gimbal can be a first gimbal defining a first gimbal axis, and the sensor assembly can include a second gimbal. The rotary coupling can be a first rotary coupling, and a second rotary coupling can be interposed between the first gimbal and the second gimbal along the first gimbal axis. The sensor assembly can include one or more of a daylight camera, a longwave infrared camera, and a shortwave infrared camera communicative with a receiver through the rotary coupling to communicate image data to the receiver. The sensor assembly can also include one or more direct-current brushless motors, a video processing module, and a wireless transfer module communicative with the transceiver through the rotary coupling to communicate and control image data conveyed to the transceiver.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
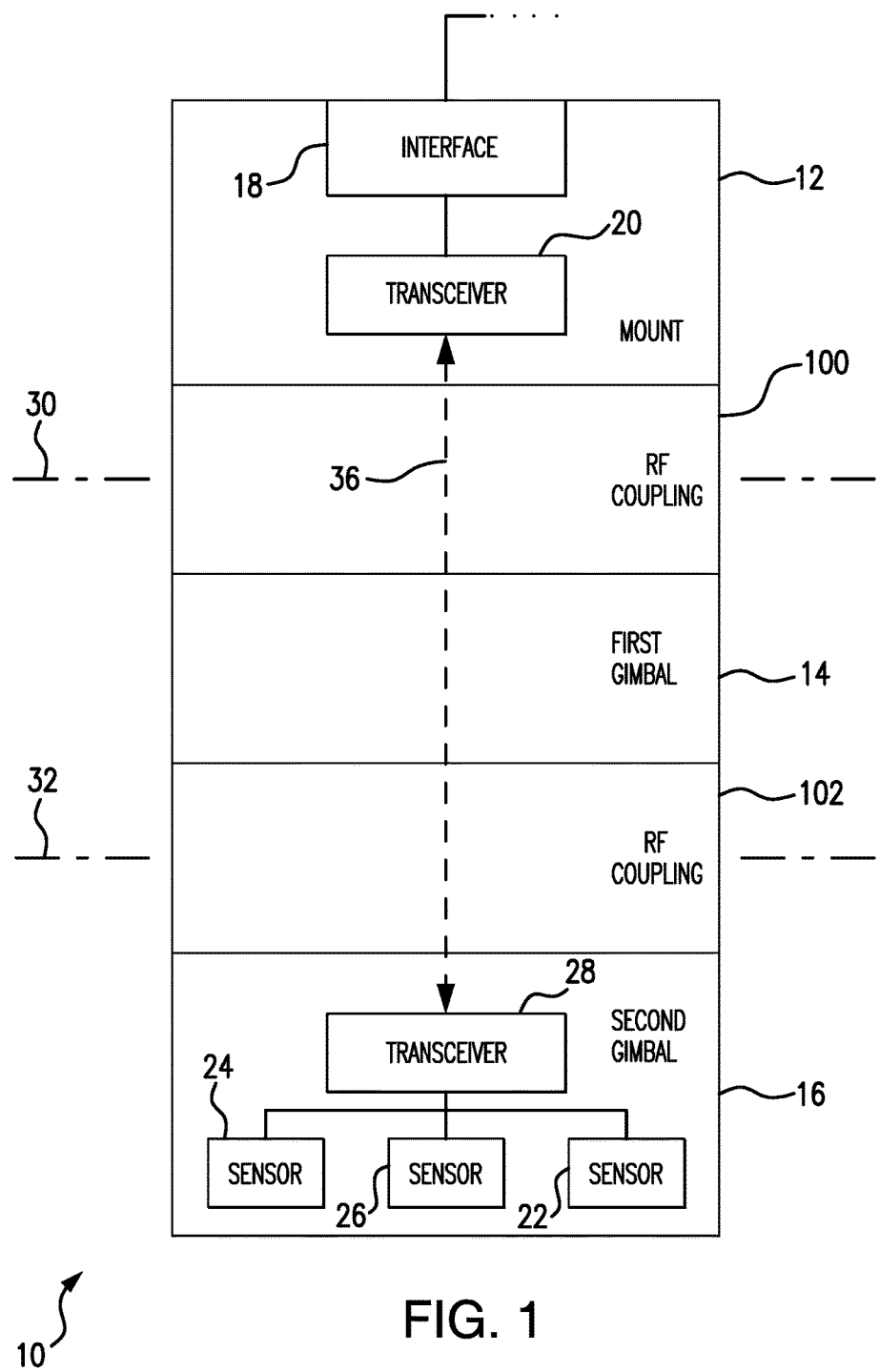
FIG. 1 is a schematic view of an exemplary embodiment of a sensor assembly constructed in accordance with the present disclosure, showing an rotary coupling spanning rotational interfaces between a sensor mount and gimbals of the sensor assembly.

Reference will now be made to the drawings wherein like reference numerals identify similar structural features or aspects of the subject disclosure. For purposes of explanation and illustration, and not limitation, a partial view of an exemplary embodiment of a rotary coupling in accordance with the disclosure is shown in FIG. 1 and is designated generally by reference character 100. Other embodiments of rotary couplings and devices including such rotary couplings in accordance with the disclosure, or aspects thereof, are provided in FIGS. 2-4, as will be described. The systems and methods described herein can be used in sensor assemblies, such as for vehicles or aircraft, however the invention is not limited to vehicular and aircraft sensor assemblies or to sensor assemblies in general.

With reference to FIG. 1, an exemplary embodiment of a sensor assembly 10 is shown. Sensor assembly 10 includes a mount 12, a first gimbal 14, and a second gimbal 16. Mount 12 includes an interface 18 electrically connected to a transceiver 20 and configured to communicate through an aircraft communications bus. Second gimbal 16 includes a payload including one or more sensors. In the illustrated exemplary embodiment the payload includes a daylight sensor 22, a shortwave infrared sensor 24, and a longwave infrared sensor 26. Daylight sensor 22 is configured and adapted to acquire image data from visible light incident upon daylight sensor 22, and is electrically connected to a transceiver 28 carried by second gimbal 16. Shortwave infrared sensor 24 is configured and adapted to acquire image data from shortwave infrared electromagnetic radiation incident upon shortwave infrared sensor 24, and is electrically connected to a transceiver 28. Longwave infrared sensor 26 is configured and adapted to acquire image data from longwave electromagnetic radiation incident upon longwave infrared sensor 26, and is electrically connected to a transceiver 28.

First gimbal 14 is supported by mount 12 and is separated therefrom by a first rotary interface 30. Rotary coupling 100 is interposed between mount 12 and first gimbal 14, spans first rotary interface 30, and places transceiver 28 of second gimbal 16 in electromagnetic communication with transceiver 20 of mount 12 through an electromagnetic link 36. Second gimbal 16 is supported by first gimbal 14 and is separated therefrom by a second rotary interface 32. Rotary coupling 102 is interposed between first gimbal 14 and second gimbal 16, spans second rotary interface 32, and also places transceiver 28 of second gimbal 16 in electromagnetic communication with transceiver 20 of mount 12 through electromagnetic link 36. In embodiments, electromagnetic link 36 is a non-optical data link, conveying image data using radio-frequency energy by way of non-limiting example. Although described herein a communicating image data, is it to be understood and appreciated that electromagnetic link 36 may also communicate command and control data to direct-current brushless motors operatively connected to first gimbal 14 and/or second gimbal 16. It is also contemplated that electromagnetic link 36 may convey power to one or more devices carried by first gimbal 14 and/or second gimbal 16.

Figure 2:
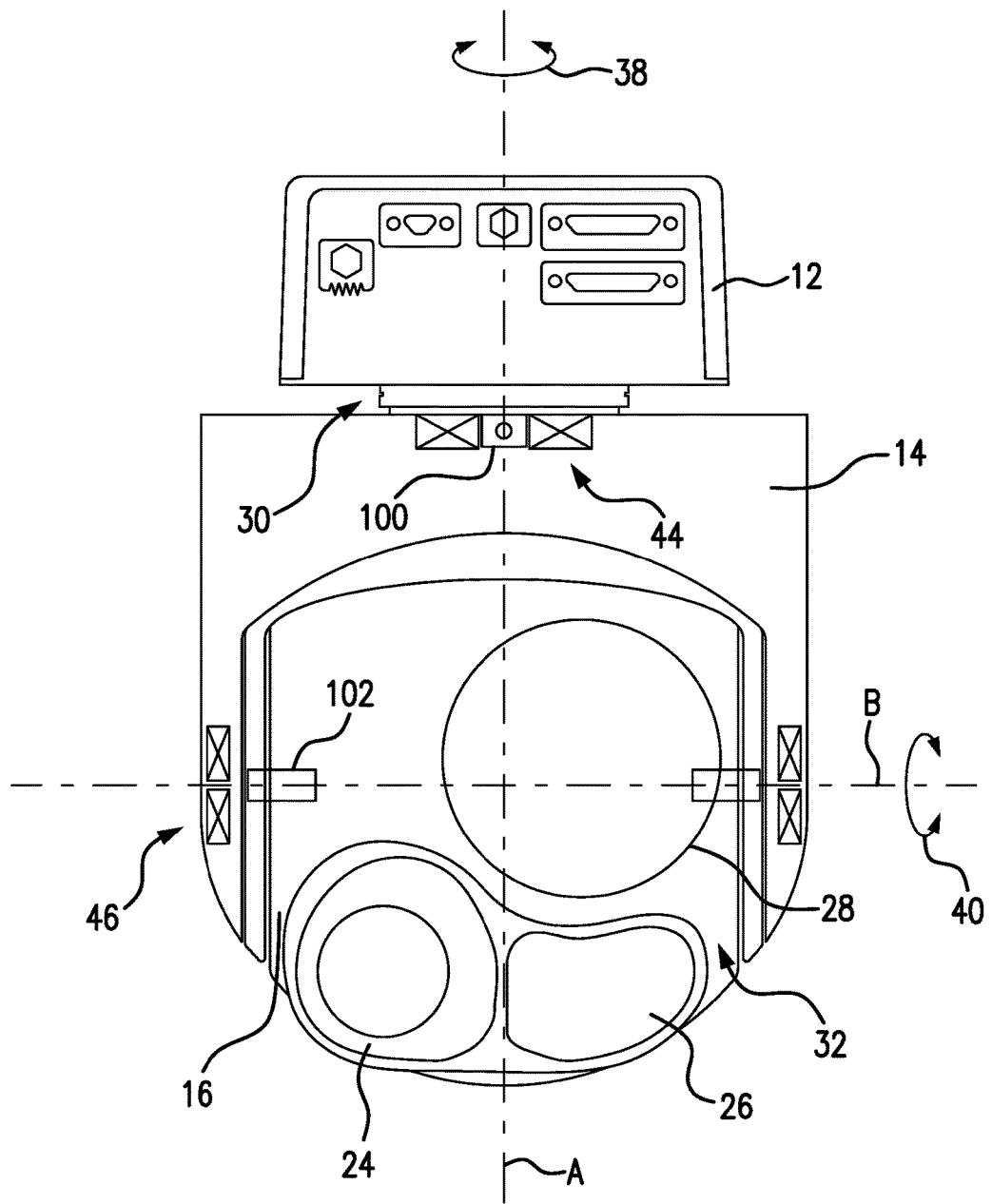
FIG. 2 is a perspective view of an exemplary embodiment of the sensor assembly of FIG. 1, showing axes defined by the mount and first gimbal of the sensor assembly.

With reference to FIG. 2, sensor assembly 10 is shown. Mount 12 defines a mount axis A. Rotary coupling 100 is interposed within a bearing 44 between mount 12 and first gimbal 14 in an on-axis arrangement, mount axis A extending through rotary coupling 100. First gimbal 14 is pivotably supported about mount axis A, and rotatable thereabout as indicated by arrow 38. First gimbal 14 defines a gimbal axis B that is orthogonal relative to mount axis A. Rotary coupling 102 within a bearing 46 is interposed between first gimbal 14 and second gimbal 16 in an on-axis arrangement, gimbal axis B extending through rotary coupling 102. Second gimbal 16 is pivotably supported about gimbal axis B, and rotatable thereabout as indicated by arrow 40. It is contemplated that bearing 44 and/or bearing 46 have a central aperture with a diameter that is about two (2) inches in diameter within which the respective rotary coupling is received.

Figure 3:
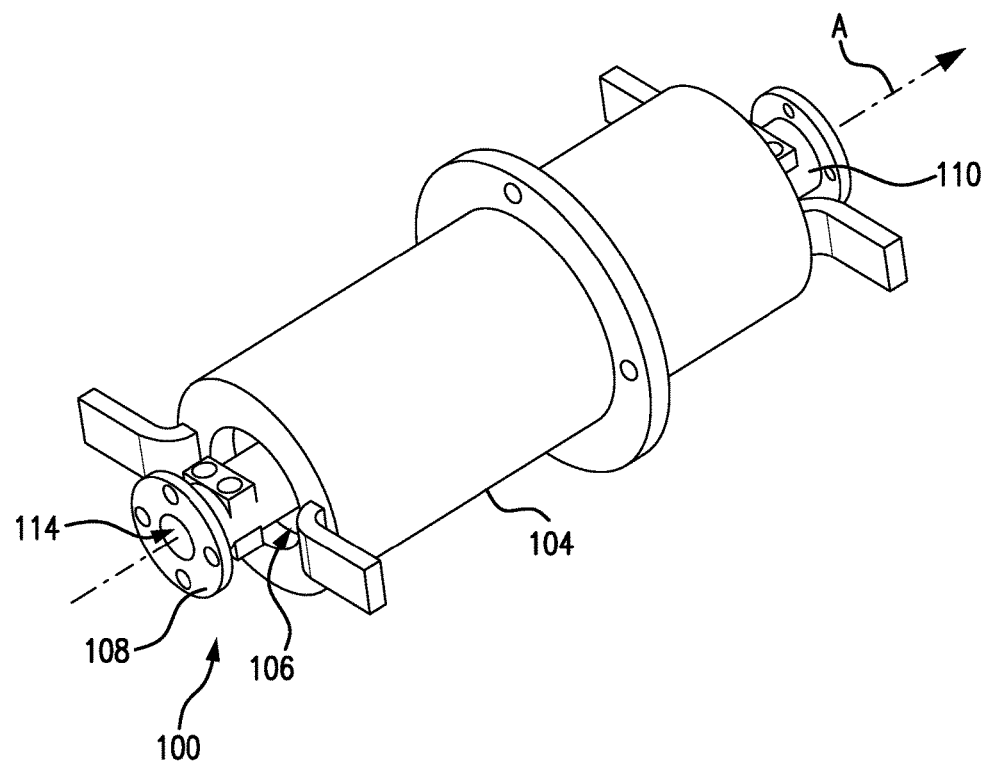
FIG. 3 is a perspective view of the rotary coupling of FIG. 1, showing waveguides of a rotary coupling disposed within a through bore of a slip ring.

With reference to FIG. 3, rotary coupling 100 is shown. Rotary coupling 100 includes a slip ring 104 defining a through bore 106, a first waveguide 108, and a second waveguide 110. First waveguide 108 extends into through bore 106 on-axis along mount axis A, and abuts therein to second waveguide 110, which is also disposed on-axis along mount axis A.

First waveguide 108 and second waveguide 110 are both hollow. In this respect first waveguide 108 and second waveguide 110 define a central aperture with a circular cross-sectional area 114. It is contemplated that first waveguide 108 and second waveguide 110 each have an external diameter that is less than about 2 inches (about 50 millimeters), allowing first waveguide 108 and second waveguide 110 to be received within bearings rotatably supporting first gimbal 14 relative to mount 12. It is also contemplated that first waveguide 108 and second waveguide 110 each defines an internal diameter that on the order of about 0.2 inches (about 4.5 millimeters). This renders first waveguide 108 and second waveguide 110 suitable for conveying radio frequency energy in the range between about 57 gigahertz and 64 gigahertz.

In embodiments, the circular cross-sectional area of first waveguide 108 and second waveguide 110 has a diameter sufficient to allow electromagnetic link 36 (shown in FIG. 1) to have a radio frequency bandwidth of about 7 gigahertz. Data rates of multiple gigabits per second or greater are achievable for transceiver 20 and transceiver 28 within an RF bandwidth of less than 2.0 gigahertz, at a selectable frequency range of between 57 and 64 gigahertz, enabling the use of off-the-shelf transceiver devices at opposite ends of electromagnetic link 36. Rotary coupling 102 (shown in FIG. 1) is similar to rotary coupling 100, with the difference that rotary coupling 102 is disposed along gimbal axis B. Although illustrated with single transceivers at opposite ends of the link, it is to be understood and appreciated that multiple transceivers other opposite ends of the link with communication therebetween being multiplexed using one or more multiplexer modules.

Figure 4:
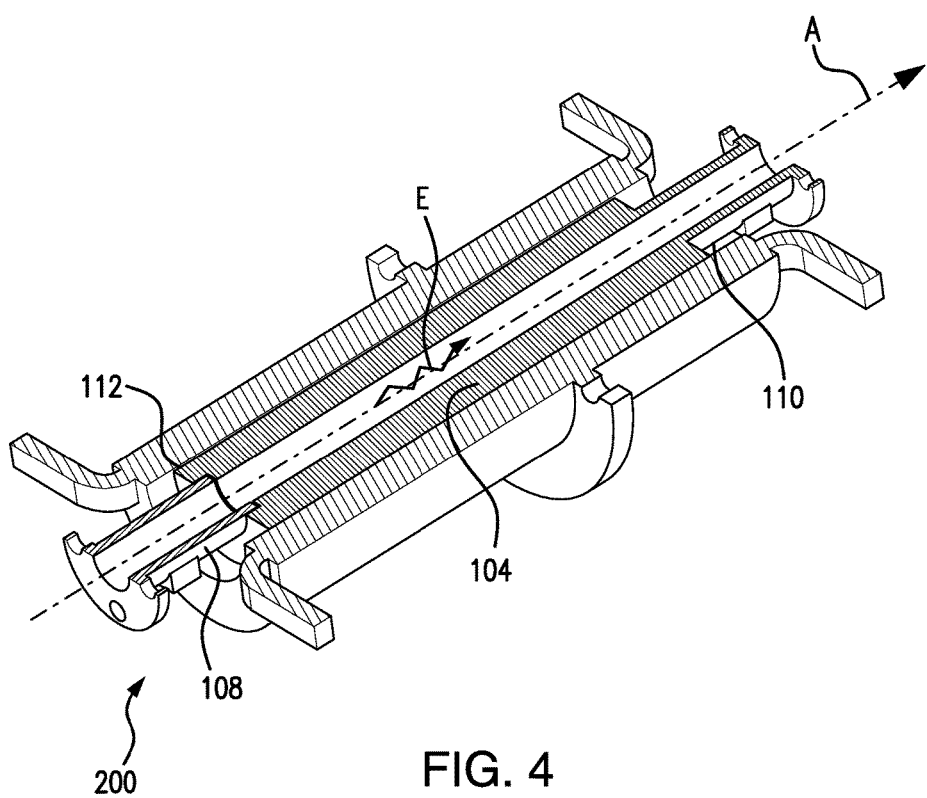
FIG. 4 is cross-sectional perspective view of the rotary coupling of FIG. 1, showing the waveguides and interior of the slip ring through bore.
Figure 5:
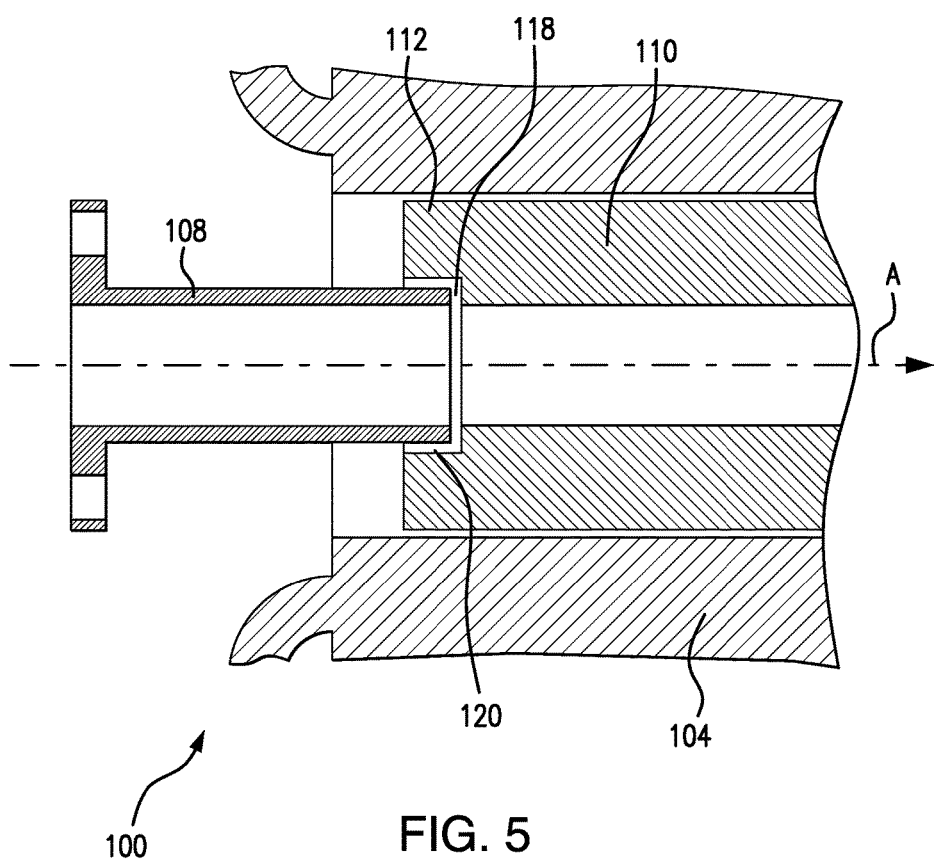
FIG. 5 is a cross-sectional side elevation view of the rotary coupling of FIG. 1, showing axial and radial gaps between the waveguides of the rotary coupling.

With reference to FIGS. 4 and 5, rotary coupling 100 is shown. First waveguide 108 and second waveguide 110 of rotary coupling 100 are coaxial with one another along mount axis A. First waveguide 108 is rotatably relative to second waveguide 110, and is supported for rotation relative to second waveguide 110 about mount axis A. Second waveguide 110 includes a collar 112 on an end abutting first waveguide 108. Collar 112 extends circumferentially about mount axis A, and spans an axial gap 118 (shown in FIG. 5) defined between ends of first waveguide 108 and second waveguide 110. It is contemplated that axial gap 118 has a gap width that is less than one-quarter the wavelength of electromagnetic radiation E (shown in FIG. 4) traversing electromagnetic link 36. Collar 112 also extends circumferentially along first waveguide 108 and defines a radial gap 120 (shown in FIG. 5) between an inner surface of collar 112 and an outer surface of first waveguide 108. It is contemplated that radial gap 120 have a gap width that is less than one-quarter of the wavelength of electromagnetic radiation E (shown in FIG. 4) traversing electromagnetic link 36. In certain embodiments, the axial overlap provided by collar 112 can about one-quarter of a wavelength or an odd multiple of one-quarter of a wavelength of radio frequency energy conveyed through electromagnetic link.

Collar 112 is disposed within through bore 106, and is circumferentially surrounded by slip ring 104. Slip ring 104 also circumferentially surrounds portions of both first waveguide 108 and second waveguide 110. Axial overlap provided by collar 112 reduces the impendence discontinuity otherwise presented by the mechanical separation of first waveguide 108 and second waveguide 110 to electromagnetic radiation E conveyed between first waveguide 108 and second waveguide 110. Although illustrated as being connected to second waveguide 110 and separated from first waveguide 108 by gaps, it is to be understood and appreciated that collar 112 can alternatively be connected to (or defined by) first waveguide 108 and separated from second waveguide 110 by respective axial and radial gaps. In this regard collar 112 can be fixed relative to mount 12, first gimbal 14, or second gimbal 16, as suitable for a given application.

The methods and systems of the present disclosure, as described above and shown in the drawings, provide for sensor assemblies with superior properties including improved data rates across rotatable interfaces between mechanical components. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A sensor assembly, comprising:
a mount defining a mount axis;
a gimbal rotatably supported about the mount axis;
a sensor coupled to the gimbal; and
a rotary coupling, comprising:
a first waveguide;
a second waveguide coaxial with the first waveguide and supported for rotation relative to the first wave guide; and
a collar connected to one of the first and second waveguides, wherein the collar extends circumferentially about an end of the other of the first and second waveguides to reduce attenuation of electromagnetic radiation conveyed between the first waveguide and the second waveguide,
wherein the rotary coupling is interposed between the mount and the gimbal along the mount axis, wherein the first waveguide is fixed relative to the mount and the second waveguide is fixed relative to the gimbal such that the sensor is electromagnetically coupled to a receiver fixed relative to the mount.

2. The sensor assembly as recited in claim 1, wherein collar spans an axial gap defined between abutting ends of the first and second waveguides.

3. The sensor assembly as recited in claim 2, wherein the axial gap has a width that is less than about one-quarter the wavelength of electromagnetic radiation conveyed between the first and second waveguides.

4. The sensor assembly as recited in claim 1, wherein the collar defines a radial gap between the other of the first and second waveguides.

5. The sensor assembly as recited in claim 4, wherein the radial gap has a gap width that is less than about one-quarter the wavelength of electromagnetic radiation conveyed between the first and second waveguides.

6. The sensor assembly as recited in claim 1, wherein the first and second waveguides are circular.

7. The sensor assembly as recited in claim 1, wherein the first and second waveguides each include a hollow tube.

8. The sensor assembly as recited in claim 1, wherein the first and second waveguides have an external diameter that is smaller than 2 inches (about 50 millimeters).

9. The sensor assembly as recited in claim 1, wherein the first and second waveguides have a central aperture with a diameter that is on the order of about 0.2 inches (about 4.5 millimeters).

10. The sensor assembly as recited in claim 1, wherein the rotary coupling comprises a slip ring with a through bore, wherein the collar is disposed within the through bore and axially overlapped by the slip ring.

11. The sensor assembly as recited in claim 1, wherein the rotary coupling includes a slip rig with a through bore interposed between the mount and the gimbal, a first end of the slip ring being connected to the mount, an opposed second end of the slip ring being connected to the gimbal, and the collar of the rotary coupling being disposed within the bore and axially overlapped by the bore, wherein the slip ring has a diameter that is less than about two inches (50 millimeters).

12. The sensor assembly as recited in claim 1, wherein the sensor array includes at least one of a daylight camera, a longwave infrared camera, and a shortwave infrared camera connected to a video processing unit through the rotary coupling.

13. The sensor assembly as recited in claim 1, wherein the gimbal is a first gimbal and the rotary coupling is a first rotary coupling, and further including:
a second gimbal supported for rotation relative to the first gimbal about an axis defined by the first gimbal; and
a second rotary coupling as recited in claim 1 interposed between the first gimbal and the second gimbal along the first gimbal axis, wherein the first rotary coupling is connected to the sensor array through the second rotary coupling.

14. The sensor assembly as recited in claim 1, further including a slip ring with a through bore housing the rotary coupling, wherein an electrical lead extends from the mount to the gimbal through the bore of the slip ring.

15. A rotary coupling for gimbal mounted sensor assembly, comprising: a first waveguide; a second waveguide coaxial with the first waveguide and supported for rotation relative to the first wave guide; and a collar connected to one of the first and second waveguides, wherein the collar extends circumferentially about an end of the other of the first and second waveguides to reduce attenuation of electromagnetic radiation conveyed between the first waveguide and the second waveguide, and wherein the second waveguide is spaced apart from the first waveguide by an air gap extending between an interior of the first and second waveguides and an environment external of the rotary coupling.

16. The rotary coupling as recited in claim 15, wherein the air gap extends through an axial gap defined between abutting ends of the first waveguide and the second waveguide.

17. The rotary coupling as recited in claim 15, wherein the air gap extends through radial gap defined between the collar and an end of the first waveguide.

18. The rotary coupling as recited in claim 15, wherein the air gap has a cross-sectional area that is smaller than a cross-sectional area of the first wave guide and a cross-sectional area of the second waveguide.

* * * * *